United States Patent [19]

Preg et al.

[11] Patent Number: 4,672,167

[45] Date of Patent: Jun. 9, 1987

[54] METHOD AND APPARATUS FOR WELDING METALLIC PARTS

[75] Inventors: Robert Preg; James Hartman, both of Reading, Pa.

[73] Assignee: General Battery Corporation, Reading, Pa.

[21] Appl. No.: 745,851

[22] Filed: Jun. 17, 1985

[51] Int. Cl.⁴ .............................................. B23K 11/24
[52] U.S. Cl. .................................. 219/117.1; 219/110
[58] Field of Search ............................. 219/110, 117.1

[56] References Cited

U.S. PATENT DOCUMENTS

| | | | |
|---|---|---|---|
| 3,586,815 | 6/1971 | Eijasbergen et al. | 219/110 |
| 4,289,948 | 9/1981 | Jurek et al. | 219/110 |
| 4,296,304 | 10/1981 | Defourny | 219/86.41 |
| 4,302,653 | 11/1981 | Denning et al. | 219/110 |
| 4,317,980 | 3/1982 | Goodrich et al. | 219/117 |
| 4,329,561 | 5/1982 | Schafer et al. | 219/110 |
| 4,341,940 | 7/1982 | Defourny | 219/117 |
| 4,387,289 | 6/1983 | Nakata et al. | 219/110 |
| 4,388,515 | 7/1983 | Mathews | 219/110 |
| 4,408,114 | 10/1983 | Nakata et al. | 219/110 |
| 4,408,115 | 10/1983 | Tanenbaum | 219/119 |
| 4,433,278 | 2/1984 | Lowndes et al. | 320/48 |

FOREIGN PATENT DOCUMENTS

| | | | |
|---|---|---|---|
| 56-148480 | 11/1981 | Japan | 219/110 |
| 1600319 | 10/1981 | United Kingdom | 219/110 |

*Primary Examiner*—Clifford C. Shaw
*Attorney, Agent, or Firm*—Benasutti and Murray

[57] ABSTRACT

A method and apparatus is provided for applying an electrical welding current between contacting members upon detecting a predetermined electrical resistance therebetween. Measurement current pulses are applied through the contacting members prior to the initiation of a weld current therethrough. Measurement voltage pulses, induced by the applied measurement current pulses, are compared against a reference voltage level. When the magnitude of the voltage pulses decreases to a value less than the reference voltage level, a weld signal is generated which causes the application of the weld current through the contacting members for a predetermined period of time.

12 Claims, 2 Drawing Figures

METHOD AND APPARATUS FOR WELDING METALLIC PARTS

BACKGROUND OF THE INVENTION

The present invention relates generally to the field of electrical resistance welding and more particularly to methods and apparatus for making intercell welds in lead acid electric storage batteries.

A typical lead acid electric storage battery generally includes a container which is separated into a plurality of compartments by a series of partitions. A cell group is positioned within each of the compartments, the cell groups being appropriately interconnected to complete the assembled battery.

Each cell group typically comprises a series of interleaved positive and negative plates, with respective positive and negative plates being electrically interconnected by straps extending therebetween. To form the battery, these straps must be interconnected so that the positive strap of one cell group is electrically connected to the negative straps of an adjacent cell group. One way that this may be accomplished is by providing each of the partitions with an aperture, and by providing each of the battery straps with an upstanding lug positioned so that the adjacent lug pairs can be connected to each other through the aperture of the partition using any of a variety of techniques. One technique which can be used for interconnecting cell groups is resistance welding. One example of this technique may be found, for instance, in U.S. Pat. No. 4,166,210.

Generally, the technique illustrated in U.S. Pat. No. 4,166,210 calls for flat outer surfaces of the battery lugs to be positioned adjacent the partition and substantially enclosing the aperture. Thereafter, a pair of weld jaws are positioned adjacent the exposed surfaces of the battery lugs so that electrodes attached to the weld jaws can extrude portions of the lug material into the aperture of the partition. Upon achieving contact of the lug material, an electric current is directed through the weld jaws, the electrodes and the battery lugs. A strong and efficiently produced weld results, providing the desired intercell connection.

The foregoing technique has been found to work very well in providing effective intercell welds. However, despite the improvements afforded by such a technique, it has been found that a number of batteries still must be rejected for failure to achieve a proper intercell weld. Since a typical automotive lead acid electrical storage battery generally includes five such welds, the problem is multiplied because failure of any one of these welds can result in rejection of the entire battery. For this reason, continued attempts have been made to further refine this intercell weld technique.

One variable which has been found to have a significant effect on weld performance is the contact resistance between the extended material of the lugs prior to the application of the electrical welding current. This contact resistance is itself a function of variables such as contact area and surface conditions of the lug material. Since the lug material is normally lead, the surface conditions are affected by the presence of lead oxide as a result of oxidation, which increases electrical contact resistance. The contact area is a function of hardness of the lead material, the pressure exerted on the lugs by the weld jaws, as well as the shape of the extruding electrodes. Consequently, a number of variables must be precisely controlled in order to consistently attain the desired contact resistance. If the initial contact resistance is too high, hot spots and blow outs can occur thereby creating a faulty weld. On the other hand, if the contact resistance is too low, cold welds can result which are also unacceptable.

It is therefore desirable to develop a method and apparatus for precisely determining the electrical resistance between the contacting lug material prior to the application of the electrical weld current in order to reliably and consistently produce quality intercell welds.

SUMMARY OF THE INVENTION

In accordance with the present invention, a method and apparatus is provided for applying an electrical welding current between contacting members upon detecting a predetermined electrical resistance therebetween. Measurement current pulses are applied through the contacting members prior to the initiation of a weld current therethrough. Measurement voltage pulses, induced by the applied measurement current pulses, are compared against a reference voltage. When the magnitude of the measurement voltage pulses decreases to a value less than the reference voltage level, a weld signal is generated which causes the application of the weld current through the contacting members for a predetermined period of time. A synchronous detector compares the magnitude of each measurement voltage pulse just prior to the application of the measurement current pulse, with the magnitude of each measurement voltage pulse produced during the application of each measurement current pulse in order to substantially eliminate pulse distortion and therefore minimize measurement errors. The output of the synchronous detector is a substantially distortion free voltage level which is compared with the reference voltage for use in the subsequent triggering of the weld current from the electrical resistance welder.

It is therefore an overall object of the present invention to provide an apparatus and method for effecting reliable and consistent welds between two contacting members.

It is another object of the present invention to provide a method and apparatus for effecting reliable and consistent welds between cells in a lead acid electric storage battery.

It is a further object of the present invention to provide a method and apparatus for precisely determining the electrical resistance between two contacting members prior to initiation of a weld current therebetween.

It is yet another object of the present invention to provide a method and apparatus for triggering an electric weld current through two contacting members upon achieving a predetermined contact resistance therebetween, which contact resistance is reliably and consistently measured.

It is still a further object of the present invention to provide a method and apparatus for generating a weld current through contacting members in response to measurement of a predetermined contact resistance, which measurement is unaffected by extrinsic variables such as material surface conditions, material hardness, weld jaw pressure, extruding electrodes or the like.

These and other objects of the present invention will become apparatus from the following more detailed description.

BRIEF DESCRIPTION OF THE DRAWINGS

The present invention may be more readily understood by reference to the accompanying drawings in which.

DETAILED DESCRIPTION OF THE PREFERRED EMBODIMENT

Figure 1:
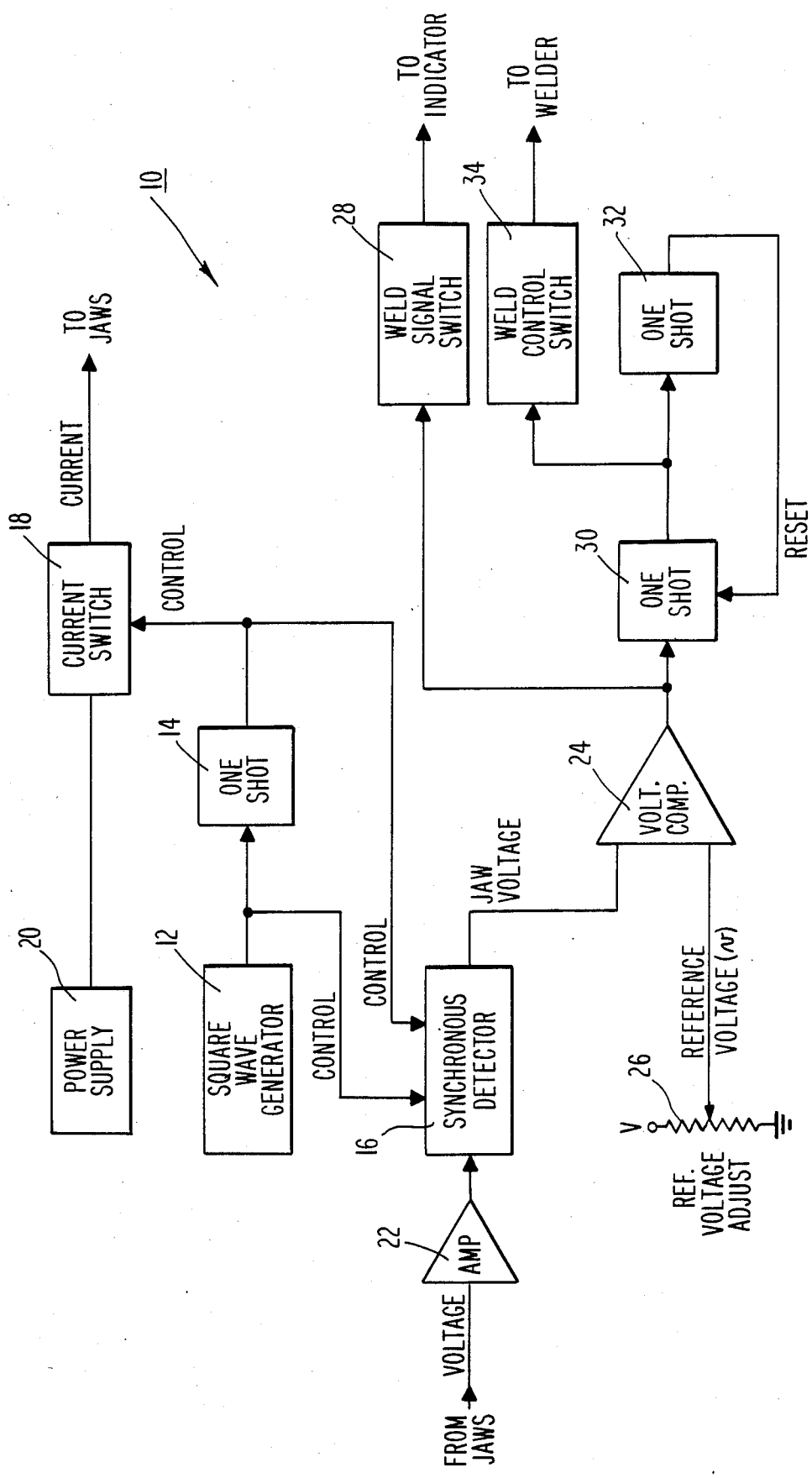
FIG. 1 is a block diagram of the preferred embodiment of the apparatus of the present invention.

Referring to FIG. 1, there is shown a block diagram of a preferred embodiment of the electronic weld trigger in accordance with the present invention, generally designated 10. The weld trigger 10 comprises a square wave generator 12, the output of which is coupled to a first one shot 14 and a control input of a synchronous detector 16. The output of the first one shot 14 is coupled to a second control input of the synchronous detector 16 and a control input of a measurement current switch 18.

The output of a measurement current power supply 20 is connected to an input of the measurement current switch 18. The output of the measurement current switch 18 is electrically connected to a pair of weld jaws of an electrical welding apparatus (not shown). As stated in the background of the invention, the weld jaws are positioned adjacent the exposed surfaces of the battery lugs so that the electrodes attached to the weld jaws can extrude portions of the lug material into the aperture of the partition between the battery cell groups. Following contact, an electric weld current is directed through the weld jaws, the electrodes and the battery lugs to effect the desired intercell connection therebetween.

The weld jaws are also electrically connected to the input of measurement voltage amplifier 22 in order to couple the measurement voltage which appears across the weld jaws as a result of application of measurement current by the measurement current switch 18, to the input of the amplifier 22. The output of the measurement voltage amplifier 22 is connected to the input of the synchronous detector 16. The output of the synchronous detector 16 is connected to one input of a voltage comparator 24. The wiper of a variable potentiometer 26 is connected to a second input of the voltage comparator 24. A reference voltage (V) is connected across the potentiometer 26 thereby providing an adjustable reference voltage (V) to the second input of the voltage comparator 24. The output of the voltage comparator 24 is coupled to a weld signal switch 28 and a second one shot 30. The output of the weld signal switch 28 is coupled to an indicator, for example a light emitting diode (not shown). The output of the second one shot 30 is connected to the input of a third one shot 32 and a weld control switch 34. The output of the third one shot 32 is connected to a reset input of the second one shot 30. The output of the weld control switch is connected to an intercell welder (not shown), in order to control the application of weld current through the weld jaws, electrodes and battery lugs.

Figure 2:
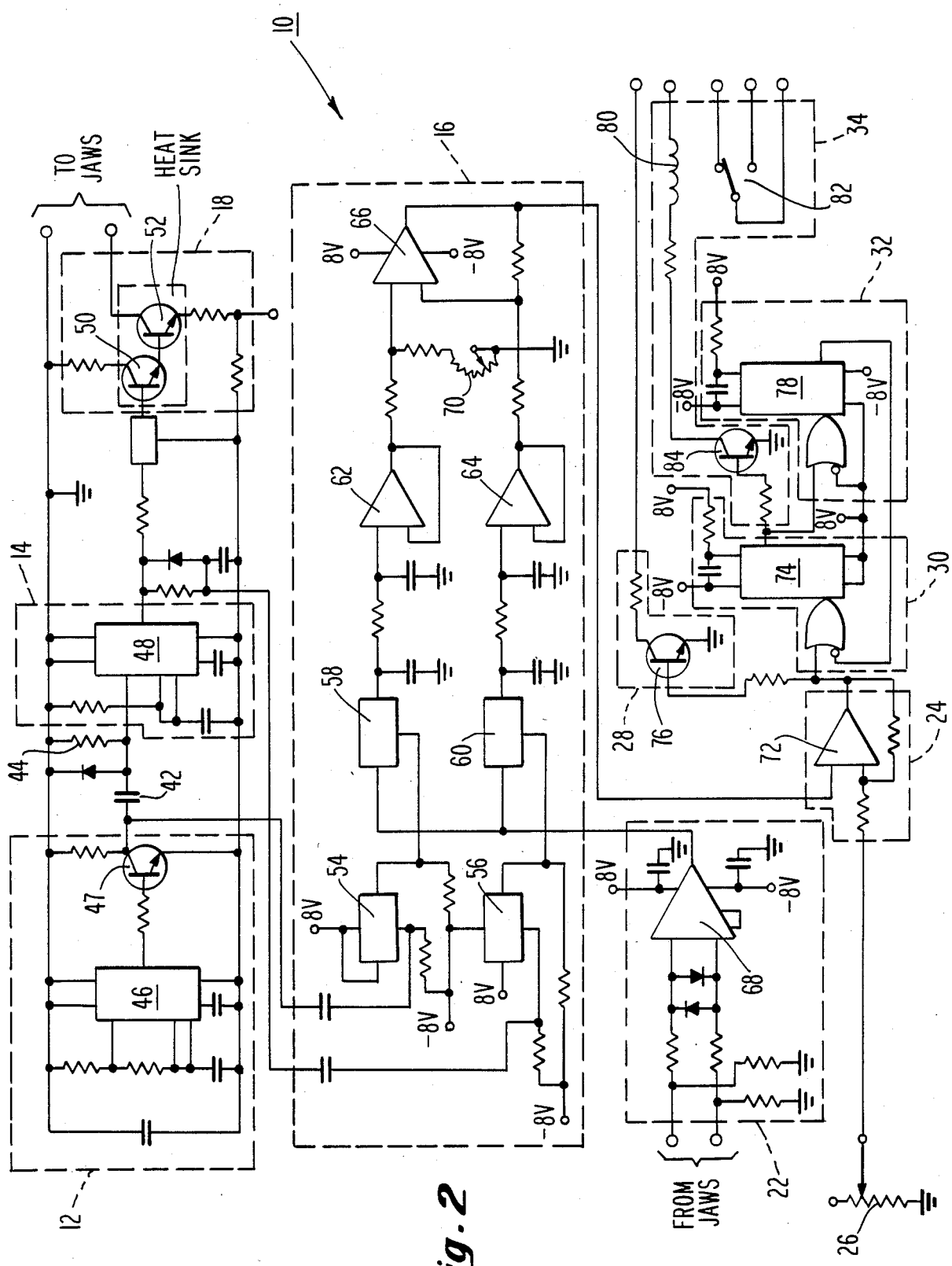
FIG. 2 is a schematic block diagram of the preferred embodiment of the apparatus of the present invention.

Referring to FIG. 2, there is shown a schematic block diagram of the electronic weld trigger 10 depicted in block diagram form in FIG. 1. The same reference numerals are used to identify the same components in both figures. The square wave generator 12 preferably comprises a National Semiconductor Corporation type LM555 timer 46 configured for astable operation as shown in the National Semiconductor Corporation publication entitled Linear Integrated Circuits, 1980 Edition, pages 9–32, which publication is incorporated in this detailed description by reference as if fully set forth herein. The output of timer 46, which is coupled to the base of a first NPN transistor 47, is a square wave having a frequency, period and duty cycle which is determined by the value of externally connected resistors and capacitors as described in the aforementioned National Semiconductor Corporation publication. The first transistor 47 is preferably a type 2N3009. Since the square wave output of the timer 46 is connected to the base of the first transistor 47, the signal appearing at the collector of the first transistor 47 will likewise be a square wave of the same frequency, period and duty cycle. This signal is coupled to the input of the first one shot 14.

The first one shot 14 preferably comprises a National Semiconductor Corporation type LM555 timer 48 connected in a monostable configuration as shown in the aforementioned National Semiconductor Corporation publication. The timer 48, connected in the aforementioned monostable configuration, provides a pulse output at a frequency which is equal to the frequency of the square wave signal frequency from the square wave generator 12. As connected in the configuration shown in FIG. 2, the pulse output from the timer 48 will be a positive going pulse with respect to a negative reference voltage. The current switch 18 comprises a second NPN transistor 50, for example a type 2N6551, the emitter of which is connected to the base of a third NPN transistor 52, for example a type TIP 29. A positive going pulse applied to the base of the first transistor 50 from the output of the first one shot 14 will cause that transistor to conduct which in turn will cause the second transistor 52 to conduct. Since the collector of the second transistor 52 is connected to one of weld jaws while the other weld jaw is connected to ground; and the emitter of the second transistor 52 is connected to the measurement current power supply 20 in the conduction state, transistor 52 when conducting will enable the flow of measurement current between the weld jaws.

The synchronous detector 16 comprises first, second, third and fourth analog switches 54, 56, 58 and 60 respectively. In the preferred embodiment, these analog switches are contained in a Motorola Type MC14066 quad analog switch integrated circuit as shown and described in the Motorola, Inc. publication entitled "CMOS Integrated Circuits", Third Printing, 1978, which publication is incorporated in this detailed description by reference as is fully set forth herein. The output of the first analog switch 54 is electrically connected to the control input of the third analog switch 58. The output of the second analog switch 56 is electrically connected to the control input of the fourth analog switch 60. The output of the third analog switch 58 is coupled to an input of a first operational amplifier 62. The output of the fourth analog switch 60 is coupled to an input of a second operational amplifier 64. The output of the first operational amplifier 62 is coupled to one input of a third operational amplifier 66. The output of the second operational amplifier 64 is coupled to a second input of the third operational amplifier 66. The first, second and third operational amplifiers, 62, 64 and 66 respectively, are preferably National Semiconductor Corporation type LM324 operational amplifiers as shown and described in the the National Semiconductor Corporation publication entitled "Linear Integrated Circuits", 1975 Edition, which publication is incorporated in this detailed description as if fully set forth herein.

The measurement voltage amplifier 22 preferably comprises a Signetics Corporation Type NE592N differential video amplifier 68 as shown and described in "IC Master" published 1984 by Hearst Business Communication, at page 3615, which publication is incorporated in this detailed description by reference as if fully set forth herein. The voltage which appears across the weld jaws as a result of application of the measurement current from the power supply 20 through the current switch 18 is coupled to the input of the amplifier 68. This measurement voltage is amplified by the differential video amplifier 68 and applied to the input of the third analog switch 58 and the input of the fourth analog switch 60.

The output of the square wave generator 12 is electrically connected to the control input of the first analog switch 54. Since the input of switch 54 is electrically connected to a reference voltage (8 volts in the preferred embodiment) this reference voltage will be switched through upon application of the control signal. Consequently, since the control signal is the output of the square wave generator 12, the output of the first analog switch 54 will be a signal which is in synchronism with the output of the square wave generator 12. This signal is applied to the control input of the third analog switch 58. Similarly, the output of the one shot 14 is electrically connected to the control input of the second analog switch 56. The input of the second analog switch 56 is also connected to the reference voltage which is switched to the output of the switch 56 by application of the signal from the output of the one shot 14. Consequently, the output of the second analog switch 56, which is coupled to the control input of the fourth analog switch 60, is a signal which is synchronism with the output of the one shot 14. As a result of a signal delay between the output of the square wave generator 12 and the input of the one shot 14 which delay is imparted by the RC network comprising the capacitor 42 and resistor 44, the output of the one shot 14 will be a signal which is likewise delayed from the square wave output of the square wave generator 12.

As previously described, the output of the first one shot 14 switches the measurement current from the power supply 20 to the weld jaws through the current switch 18. Since the delay between the output of the first one shot 14 and the application of the measurement current pulse to the jaws is negligible, it can be assumed that the measurement current will be pulsed through the weld jaws in synchronism with the output signal from the first one shot 14. As a result, it can be seen that since the output of the third analog switch 58 is the measurement voltage across the jaws prior to application of the measurement current pulse, and this output is connected to the input of the first operational amplifier 62, the output voltage of the first operational amplifier 62 is therefore a function of the measurement voltage which is appearing across the weld jaws prior to the application of the measurement current pulse. Similarly, the output voltage of the second operational amplifier 64 is a function of the measurement voltage appearing across the weld jaws during the application of the measurement current pulse. The output voltage levels from the first and second operational amplifiers, 62 and 64 respectively, are compared by the third operational amplifier 66 which produces an output signal having a magnitude which is proportional to the magnitude of the difference of the input voltage levels. The voltage output from the first operational amplifier 62, hereinafter referred to as the "reference signal", is adjusted by means of the variable resistor 70. The resistor 70 is adjusted such that the magnitude of the reference signal appearing at the input of the third operational amplifier 66 corresponds to a condition of zero resistance between the weld jaws. The output voltage from the second operational amplifier 64, which is functionally related to the voltage appearing across the weld jaws during the application of the the measurement current pulses, is compared to this reference voltage by the third operational amplifier 66 which in turn produces an output voltage having a magnitude which is proportional to the difference between the magnitude of the two input voltages.

The output voltage from the third operational amplifier 66 is coupled to one input of the voltage comparator 24 which comprises a fourth operational amplifier 72. In the preferred embodiment, the fourth operational amplifier 72 comprises a National Semiconductor Corporation Type LM320 operational amplifier as shown and described in the aforementioned National Semiconductor publication. The fourth operational amplifier 72 compares this input voltage with the reference voltage set by means of the variable potentiometer 26, which reference voltage is coupled to the second input of the fourth operational amplifier 72. The output of the fourth operational amplifier 72 is connected to the input of the second one shot 30 which, in the preferred embodiment, comprises a Motorola Type MC14538 "Dual Precision Retriggerable/Resettable Monostable Multivibrator" 74 as shown and described in the aforementioned Motorola "CMOS" Handbook. The output of the fourth operational amplifier 72 is also coupled to the base of fourth NPN transistor 76 which, in the preferred embodiment is a type 2N3904 which comprises the weld signal switch 28. The collector of the fourth transistor 76 is connected to an indicator device, for example a light emitting diode (LED), while the emitter of the transistor 76 is connected to ground. Consequently, a positive going signal applied to the base of transistor 76 from the output of the fourth operational amplifier 72 will cause transistor 76 to conduct thereby illuminating the LED indicator.

The "Q" output of the monostable multivibrator 74 is connected to the input of a second one shot 32 which, in the preferred embodiment, comprises a second Motorola Type MC14538 "Dual Precision Retriggerable/Resettable Monostable Multivibrator" 78, as shown and described in the aforementioned Motorola publication. The "$\overline{Q}$" output of the monostable multivibrator 78 is connected to the "V" input of the first monostable multivibrator 74.

In the preferred embodiment the weld control switch 34 comprises a relay having a coil 80 and contacts 82. The coil 80 is conneced between a power source (not shown) and the collector of a fifth NPN transistor 84. In the preferred embodiment, the transistor 84 is a type 2N3904. The emitter of transistor 84 is connected to ground while the base is connected to the "Q" output of the first monostable multivibrator 74. As a result, a positive going pulse applied from the "Q" output of the first monostable multivibrator 74 will cause transistor 84 conduct thereby energizing coil 80 which in turn causes the contacts 82 to switch from their normally opened position to their energized position.

The electronic weld trigger operates as follows. With the weld jaws positioned adjacent the exposed surfaces of the battery lugs, the current switch 18 is operated by the square wave generator 12 and one shot 14 to apply measurement current pulses to the weld jaws. As the weld jaws begin to extrude portions of the lug material into electrical contact, the measurement current flows through the contacting lug material and the measurement voltage pulses appearing at the input of the amplifier 22 begin to decrease in magnitude as the electrical resistance decreases due to an increasing contact area of the lug material. The synchronous detector 16 compares the magnitude of the measurement voltage pulses from the weld jaws both before and during the application of the current pulses thereto in order to eliminate the effect of distortion as previously described. Consequently, the output of the synchronous detector 16, which is coupled to one input of the voltage comparator 24, comprises a DC voltage having a magnitude which is a function of the magnitude of the voltage pulses from the jaws, and which is substantially distortion free. Since the amplitude of these measurement voltage pulses is proportional to the contact area of the lug material, they will decrease in magnitude as the resistance of the contacting lug material decreases.

It has been found that initiation of the welding current through the contact area when the area has achieved a predetermined size, results in consistent high quality welds. It has also been found that the aforementioned pulsed current and voltage measurement technique yields a reliable and consistent indication of contact area size. Consequently, the reference voltage which is coupled to the second input of the voltage comparator 24 is adjusted to a magnitude which, when compared with the magnitude of the voltage pulses from the synchronous detector 16 will result in an output from the voltage comparator 24 when the voltage pulses from the synchronous detector 16 are reduced to a magnitude which corresponds to the predetermined contact area.

As the jaws continue to extrude more lug material into contact, the voltage pulses from the detector 16 decrease in magnitude causing the voltage comparator 24 to trigger the second one shot 30 and to operate the weld signal switch 28. The weld signal switch 28 in turn operates its corresponding indicator. The second one shot 30 operates the weld control switch 34 which in turn causes the welder to apply weld current through the contacting surface. This weld current is applied for a predetermined period which is adjustable on the welder. The second one shot 30 also triggers a one shot 32 which outputs a reset pulse after a predetermined delay period. This ensures that the second one shot 30 will not supply successive pulses to the weld control switch 34 before the predetermined weld period has been completed.

What is claimed is:

1. An apparatus for spot welding metallic parts, said apparatus comprising:
   (a) means for forming an electrical contact region of increasing size between said parts;
   (b) means for generating a series of measurement current pulses having a predetermined magnitude through said contact region;
   (c) means for comparing the magnitude of the voltage across said contact region prior to the application of each of said measurement current pulses with the magnitude of the voltage there across during the application of each of said measurement current pulses, and generating an output voltage which is a function of the difference between said compared voltage magnitudes; and
   (d) means for applying an electrical weld current having a predetermined magnitude through said contact region for a predetermined period of time when the magnitude of said output voltage attains a predetermined value.

2. The apparatus in accordance with claim 1 wherein said means for forming said electrical contact region comprises a pair of opposed, spaced apart weld jaws having means for urging said jaws toward each other whereby portions of said metallic parts inserted therebetween are extruded into contact with each other.

3. The apparatus in accordance with claim 2 wherein said measurement and welding currents are applied through electrode tips attached to said weld jaws.

4. A method of spot welding metallic parts, said method comprising the steps of:
   (a) forming an electrical contact region of increasing size between said parts;
   (b) generating a series of measurement current pulses having a predetermined magnitude and applying said pulses through said contact region;
   (c) comparing the magnitude of the voltage across said contact region prior to the application of each of said measurement current pulses with the magnitude voltage there across during the application of each of said measurement current pulses;
   (d) generating an output voltage which is the function of the difference between said compared voltage magnitudes; and
   (e) applying an electrical weld current having a predetermined magnitude through said contact region for a predetermined period of time when the magnitude of said output voltage attains a predetermined value.

5. The method in accordance with claim 4 wherein the step of forming said electrical contact region comprises providing a pair of opposed, spaced apart weld jaws having means for urging said jaws toward each other whereby portions of said metallic parts inserted therebetween are extruded into contact with each other.

6. The method in accordance with claim 5 additionally comprising the step of attaching electrode tips to said weld jaws and applying said measurement and welding currents therethrough.

7. An apparatus for welding lead parts, disposed on opposite sides of a partition of a battery case, through an aperture in said partition, said apparatus comprising:
   (a) means for forming an electrical contact region of increasing size between said parts through said aperture;
   (b) means for generating a series of measurement current pulses having a predetermined magnitude and applying said pulses through said contact region;
   (c) means for comparing the magnitude of the voltage across said contact region prior to the application of each of said measurement current pulses with the magnitude of the voltage there across during the application of each of said measurement current pulses, and generating an output voltage which is a function of a difference between said compared voltage magnitude; and (d) means for applying an electrical welding current having a predetermined magnitude through said contact region for a predetermined period of time when the magnitude of said output voltage attains a predetermined value.

8. The apparatus in accordance with claim 7 wherein said means for forming said electrical contact region comprises a pair of opposed, spaced apart weld jaws having means for urging said jaws toward each other and whereby portions of said lead parts inserted therebetween are extruded into said aperture into contact with each other.

9. The apparatus in accordance with claim 8 wherein said measurement and welding currents are applied through electrode tips attached to said weld jaws.

10. A method for welding lead parts, disposed on opposite sides of a partition of a battery case, through an aperture in said partition, said method comprising the steps of:

(a) forming an electrical contact region of increasing size between said parts through said aperture;

(b) generating a series of measurement current pulses having a predetermined magnitude and applying said pulses through said contact region;

(c) comparing the magnitude of the voltage across said contact region prior to the application of each of said measurement current pulses with the magnitude of the voltage there across during the application of each of said measurement current pulses;

(d) generating an output voltage which is a function of the difference between said compared voltage magnitude; and (e) applying an electrical weld current having a predetermined magnitude through said contact region for a predetermined period of time when the magnitude of said output voltage attains a predetermined value.

11. The method in accordance with claim 10 wherein said step of forming said electrical contact regions comprises providing a pair of opposed, spaced apart weld jaws having means for urging said jaws toward each other whereby portions of said lead parts inserted therebetween are extruded into said aperture into contact with each other.

12. The apparatus in accordance with claim 11 additionally comprising the step of attaching electrode tips to said weld jaws and applying said measurement and welding currents therethrough.

* * * * *